United States Patent [19]

Hirakawa

[11] Patent Number: 5,061,053
[45] Date of Patent: Oct. 29, 1991

[54] TELEPHOTO ZOOM LENS SYSTEM

[75] Inventor: Jun Hirakawa, Tokyo, Japan

[73] Assignee: Asahi Kogaku Kogyo K.K., Tokyo, Japan

[21] Appl. No.: 363,656

[22] Filed: Jun. 8, 1989

[30] Foreign Application Priority Data

Jun. 8, 1988 [JP] Japan .................................. 63-140799

[51] Int. Cl.$^5$ .............................................. G02B 9/00
[52] U.S. Cl. ...................................... 359/690; 359/745
[58] Field of Search ............... 350/454, 455, 457, 427, 350/423

[56] References Cited

U.S. PATENT DOCUMENTS 4,815,829  3/1989  Yamanashi et al. ................. 350/427

FOREIGN PATENT DOCUMENTS 60-60617  4/1985  Japan .
61-241719  10/1985  Japan .
0284721  12/1986  Japan .................................. 350/457

OTHER PUBLICATIONS

The Jashin Kogyo, 1988, vol. 12.

*Primary Examiner*—Paul M. Dzierzynski
*Attorney, Agent, or Firm*—Sughrue, Mion, Zinn, Macpeak & Seas

[57] ABSTRACT

A telephoto zoom lens system featuring a zoom ratio on the order of 3 which uses an inexpensive optical material having a lens refractive index and which is compact in size can be attained. A first lens group I closest to the object side has a positive refractive power. The first lens group I includes a first negative maniscus lens element having a convex surface directed toward the object and a second positive lens element having a convex surface with a large curvature directed toward the object. A second lens group II having a negative refractive power is located on the image side of the first lens group I. A third lens group III having a positive refractive power is located on the image side of second lens group II. Lens group III includes a first lens unit IIIa having a positive refractive power and a second lens unit IIIb having a positive or negative refractive power. Zooming is performed by moving the three lens groups independently of one another along the optical axis. Focusing is performed by moving the first lens groups along the optical axis. Second lens group II preferably includes two negative lens elements and one positive lens element. Lens unit IIIa preferably includes two positive lens elements and one negative lens element while lens unit IIIb preferably includes a positive lens and a negative meniscus lens having a convex surface directed toward the image.

4 Claims, 10 Drawing Sheets

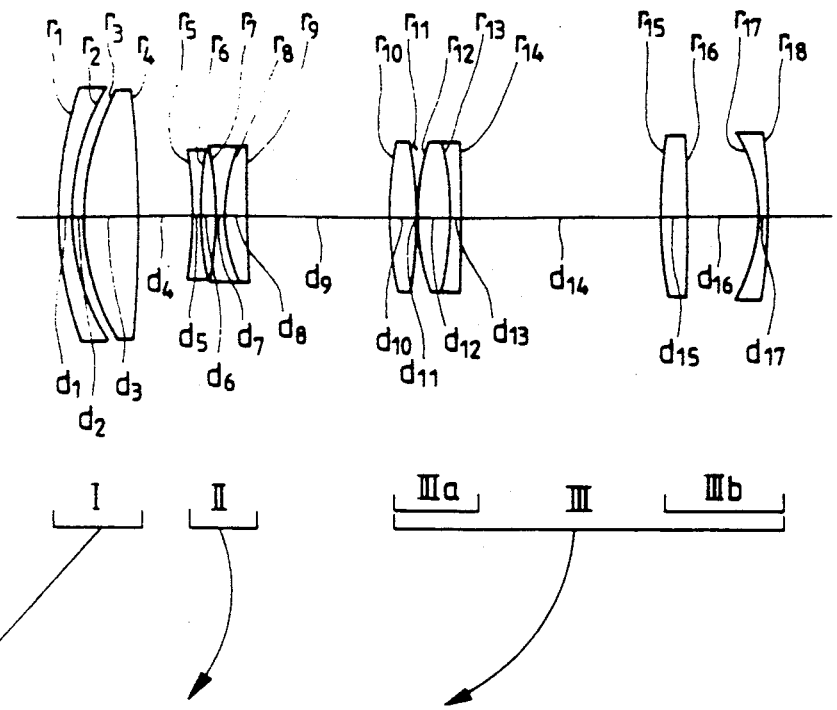
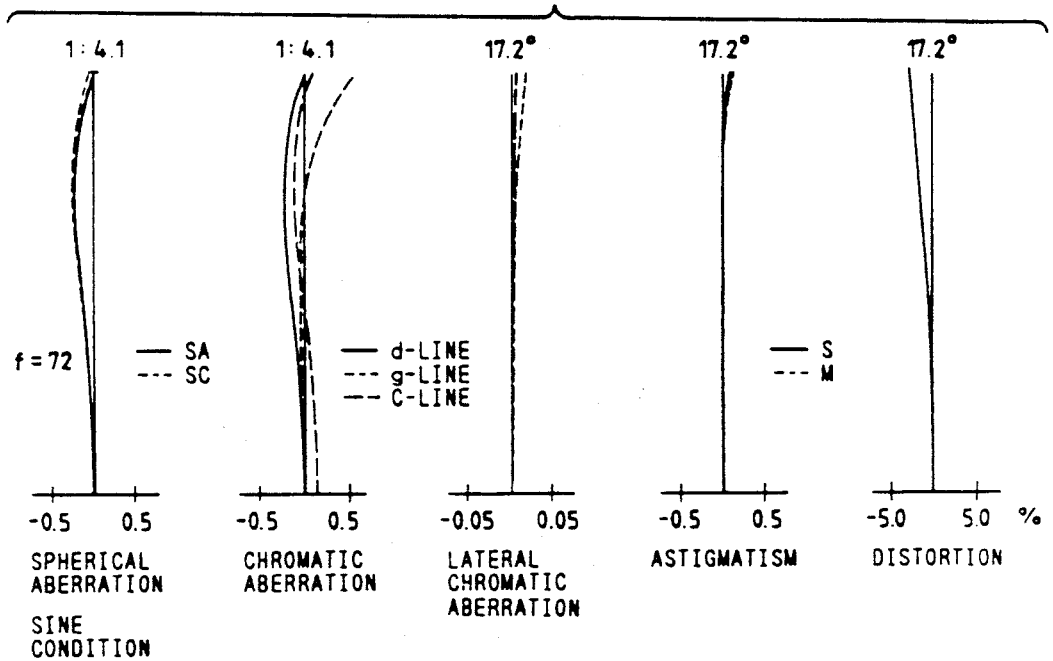

TELEPHOTO ZOOM LENS SYSTEM

BACKGROUND OF THE INVENTION

The present invention relates to a photographic zoom lens system, and more particularly to an inexpensive and compact telephoto zoom lens system that features a zoom ratio on the order of 3.

A number of telephoto zoom lens systems that feature zoom ratios on the order of 3 have been proposed in the prior art. For example, JP-A-60-60617 (the term "JP-A" as used herein means an "unexamined published Japanese patent application") describes a version that is composed of a small number of lens elements and which is inexpensive, whereas JP-A-61-241719 describes a version that is compact and low in cost.

Although the two prior art versions of zoom lens systems described above are intended to be available at low cost, they still have problems. The zoom lens system proposed in JP-A-60-60617 is composed of only eleven elements but is somewhat bulky due to the zooming method adopted. In contrast, the version proposed in JP-A-61-241719 adopts a compact zooming system. However, in order to reduce the number of lens elements to as few as eleven, an optical material having a high refractive index must be employed at the penalty of increased cost.

SUMMARY OF THE INVENTION

An object, therefore, of the present invention is to provide a telephoto zoom lens system that is both inexpensive and compact in size. A more specific object of the present invention is to provide a zoom lens system featuring a zoom ratio on the order of 3 that employs fewer lens elements than previous versions and that uses an inexpensive optical material having a low refractive index yet is compact in size and ensures satisfactory performance.

This object of the present invention can generally be attained by a telephoto zoom lens system that comprises, in order from the object side a first lens group I having a positive refractive power, a second lens group II having a negative refractive power, and a third lens group III having a positive refractive power. This telephoto zoom lens system performs zooming by moving the three lens groups I, II and III independently of one another along the optical axis while performing focusing by moving the first lens group I along the optical axis. More specifically, the first lens group I is composed of a first lens which is a negative meniscus lens element having a convex surface directed toward the object, and a second lens which is a positive lens element having a convex surface of large curvature directed toward the object. The third lens group III is composed basically of a first lens unit IIIa having a positive refractive power and a second lens unit IIIb having a positive or negative refractive power. The zoom lens system of the present invention satisfies the following additional conditions:

$$\overline{n_{IIIap}} < 1.6 \tag{1}$$

$$0.8 < |\Delta D_{(I\text{-}II)}/f_{II}| < 1.2, f_{II} < 0 \tag{2}$$

$$0.8 < r_2/r_3 < 1.0 \tag{3}$$

$$0.3 < r_3/f_1 < 0.5 \tag{4}$$

$$n_{II} > 1.65 \tag{5}$$

$$\nu_{IIp} < 35, \nu_{IIn} > 50 \tag{6}$$

$$1.0 < f_{IIIa}/f_{III} < 1.4$$

where:

$\overline{n_{IIIap}}$: the average of the refractive indices at the d-line of the positive lenses included in lens unit IIIa;

$\Delta D_{(I\text{-}II)}$: the amount of change in the aerial distance between the first and second lens groups I and II during zooming;

$f_{II}$: the focal length of the second lens group II;

$r_2$: the radius of curvature of the image side surface of the first lens of first lens group I;

$r_3$: the radius of curvature of the object side surface of the second lens of first lens group I;

$f_1$: the focal length of the first lens group I;

$\overline{n_{II}}$: the average of the refractive indices at the d-line of the lenses of which the second lens group II is composed;

$\nu_{IIp}$: the Abbe number of the positive lens included in the second lens group II;

$\nu_{IIn}$: the Abbe number of the negative lens included in the second lens group II:

$f_{III}$: the focal length of the third lens group III; and $f_{IIIa}$: the focal length of the lens unit IIIa.

In a preferred embodiment of the present invention, the second lens group II is composed of two negative lens elements and one positive lens element, and the third lens group III is composed of first lens unit IIIa which consists of two positive lens elements and one negative lens element, and second lens unit IIIb which consists of a positive lens and a negative meniscus lens having a convex surface directed toward the image.

BRIEF DESCRIPTION OF THE DRAWINGS

Other features and advantages of the present invention will be apparent from the following description taken in connection with the accompanying drawings, wherein:

FIG. 1 is a simplified cross-sectional view of the zoom lens system of Example 1 when it is at the wide-angle end, with the general manner of lens movement during zooming also being shown;

FIGS. 2A, 4A, 6A, 8A and 10A are graphs plotting the aberration curves obtained at the wide-angle end with the zoom lens systems of Examples 1, 2, 3, 4 and 5, respectively.

DETAILED DESCRIPTION OF THE INVENTION

Figure 2B:
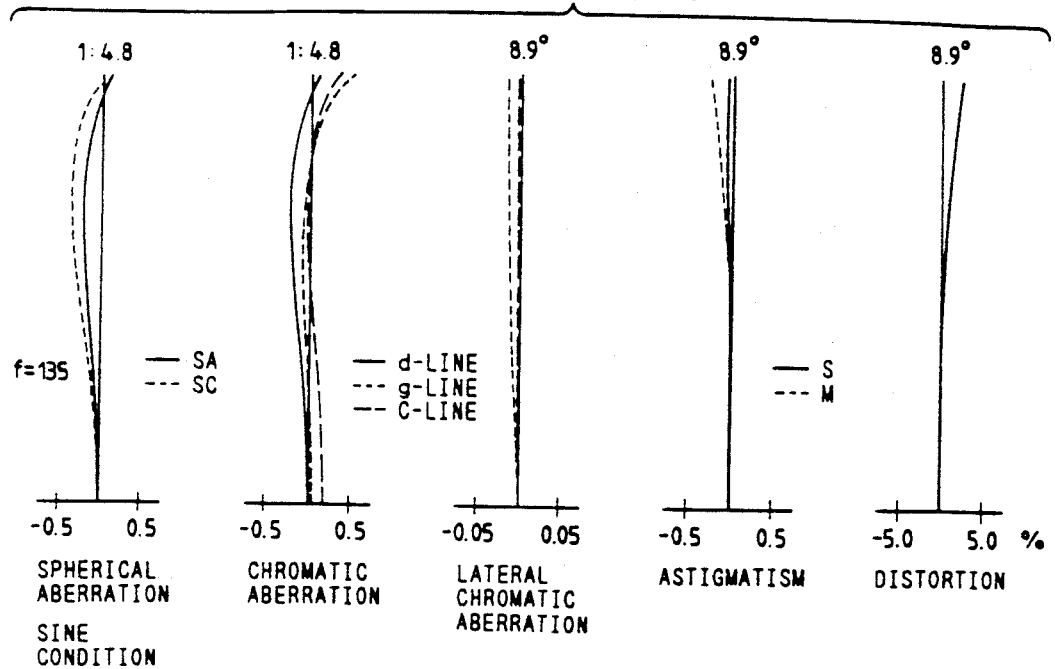
FIGS. 2B, 4B, 6B, 8B and 10B are graphs plotting the aberration curves obtained at the middle-angle end with the zoom lens systems of Examples 1, 2, 3, 4 and 5, respectively.

The conditions to be satisfied by the zoom lens system of the present invention are described hereinafter.

$$\overline{n_{IIIap}} < 1.6 \tag{1}$$

Condition (1) relates to the optical material of which the positive lenses in lens unit IIIa having a positive refractive power are made. In order to insure effective compensation for chromatic aberration, positive lenses in a lens group having a positive power are usually made of an optical material of a crown glass group having a large Abbe number. For the purpose of effective compensation for aberrations such as spherical aberration and coma, higher refractive indices are recommended. However, the higher the refractive index, the more expensive the crown glass. The crown glass cannot be too expensive due to the requirement for low cost. To provide a compromise between these limits condition (1) is set forth. Using an optical material whose refractive index is higher than the upper limit defined by condition (1) is not desirable from an economic viewpoint.

$$0.8 < |\Delta D_{(I-II)}/f_{II}| < 1.2, f_{II} < 0 \quad (2)$$

Condition (2) shows the ratio of the change in the distance between the first and second lens groups I and II during zooming (i.e., the change in the distance to the object from the second lens group II) with respect to the focal length of the second lens group II. In other words, this condition must be satisfied to insure a high zoom ratio. If the lower limit of condition (2) is not reached because $\Delta D_{(I-II)}$ is too small or because $f_{II}$ is too great, the power of the second lens group II is insufficient to provide a high zoom ratio. If the upper limit of condition (2) is exceeded because $\Delta D_{(I-II)}$ is too great, the objective of overall system compactness is not attained. If the upper limit of condition (2) is exceeded because $f_{II}$ is too small, excessive aberrations will occur during zooming. This is certainly not desirable for the purposes of the present invention.

$$0.8 < r_2/r_3 < 1.0 \quad (3)$$

$$0.3 < r_3/f_I < 0.5 \quad (4)$$

Conditions (3) and (4) specify the ranges over which the curvatures of the opposing surfaces of the first and second lenses in the first lens group I may vary. According to these conditions, the opposing surfaces of the first and second lenses assume approximately equal degrees of curvatures, which may be selected at appropriate values. If $r_2$ and $r_3$ differ so greatly that either the upper limit or the lower limit of condition (3) is not met, extra-axial performance of the system Will be impaired at the wide-angle end for several reasons including the generation of astigmatism and lateral chromatic aberration. As a further problem, spherical aberration cannot be properly compensated for at the narrow-angle end. If the value of $r_3$ is so small that the lower limit of condition (4) is not reached undercompensation of spherical aberration will occur at the narrow-angle end. If the value of $r_3$ is so great that the upper limit of condition (4) is exceeded, overcompensation of spherical aberration will occur at the narrow-angle end. In either case, the ineffective compensation cannot be eliminated by the subsequent groups because of the simplicity in the overall configuration of the system.

$$\overline{n_{II}} > 1.65 \quad (5)$$

$$\nu_{IIp} < 35, \nu_{IIn} > 50 \quad (6)$$

Conditions (5) and (6) specify the optical material to be used in the second lens group II which has a negative refractive power and which is responsible for zooming action. If the lower limit of condition (5) is not reached because an optical material having an unduly low refractive index is used in the second lens group II, the refractive power of the second lens group II will inevitably become small and its zooming action accordingly will become insufficient to provide the necessary zoom ratio. In this connection, it should be noted that keeping the refractive power by making the curvature strong is not desirable since it will cause great aberrational variations such as in spherical aberration and astigmatism during zooming.

Condition (6) is the condition for achromatism of the second lens group II. If the Abbe numbers of the optical materials used in the second lens group II are such that condition (6) is not satisfied, achromatism of the second lens group II is insufficient to prevent variations in chromatic aberration during zooming. Since these variations cannot be compensated for by either the first or the third group, it is imperative that condition (6) be fulfilled.

$$1.0 < f_{IIIa}/f_{III} < 1.4 \quad (7)$$

Condition (7) relates to the third lens group III which has the greatest power of all the components of the system of the present invention. This condition is necessary to make the third lens group III compact by designing it as a telephoto lens, thus reducing the overall size of the lens system. If the power distribution of the third lens group III is out of balance by an amount such that the lower limit of condition (7) is not reached, increased chromatic aberration will occur in the lens unit IIIa. If the upper limit of condition (7) is exceeded, the third lens group III will become bulky so that the overall size of the lens system is undesirably large.

Five specific examples of the present invention are described below by way of illustration, in which: $F_{NO}$ is an F number; f is a focal length; is a half view angle; $f_B$ is a back focus; r is the radius of curvature of an individual lens surface; d is the thickness of a lens or the aerial distance between two lenses; n is the refractive index of an individual lens at the d-line; and n is the Abbe number of an individual lens.

EXAMPLE 1

$F_{NO} = 1: 4.1 \sim 4.8 \sim 5.6$
$f = 72.00 \sim 135.01 \sim 195.00$
$\omega = 17.2 \sim 8.9 \sim 6.2$
$f_B = 39.85 \sim 52.14 \sim 65.88$

| Surface No. | r | d | n | ν |
|---|---|---|---|---|
| 1 | 56.821 | 2.50 | 1.80518 | 25.4 |
| 2 | 39.226 | 2.04 | | |
| 3 | 40.890 | 9.35 | 1.51633 | 64.1 |
| 4 | −194.297 | 9.25∼30.62∼37.19 | | |
| 5 | −73.745 | 1.50 | 1.69680 | 55.5 |
| 6 | 54.282 | 2.30 | | |
| 7 | −60.886 | 1.60 | 1.69680 | 55.5 |
| 8 | 30.057 | 3.90 | 1.80518 | 25.4 |
| 9 | 409.381 | 23.68∼10.97∼3.00 | | |
| 10 | 65.971 | 4.46 | 1.51633 | 64.1 |
| 11 | −65.971 | 0.10 | | |
| 12 | 43.333 | 5.51 | 1.51633 | 64.1 |
| 13 | −43.333 | 1.70 | 1.80518 | 25.4 |
| 14 | −439.612 | 33.71 | | |
| 15 | 80.409 | 4.54 | 1.58267 | 46.4 |

-continued

| Surface No. | r | d | n | ν |
|---|---|---|---|---|
| 16 | −195.051 | 11.78 | | |
| 17 | −26.679 | 1.70 | 1.58913 | 61.2 |
| 18 | −80.821 | | | |

$\overline{n_{IIIap}} = 1.51633$ (1)

$|\Delta D_{(I-II)}/f_{II}| = 0.918$ (2)

$r_2/r_3 = 0.959$ (3)

$r_3/f_I = 0.372$ (4)

$\overline{n_{II}} = 1.733$ (5)

$\nu_{IIp} = 25.4, \nu_{IIn} = 55.5$ (6)

$f_{IIIa}/f_{III} = 1.187$ (7)

EXAMPLE 2

$F_{NO} = 1: 4.1 \sim 4.8 \sim 5.6$
$f = 72.00 \sim 135.00 \sim 195.23$
$\omega = 17.3 \sim 8.9 \sim 6.2$
$f_B = 37.40 \sim 49.82 \sim 63.70$

| Surface No. | r | d | n | ν |
|---|---|---|---|---|
| 1 | 58.362 | 2.50 | 1.80518 | 25.4 |
| 2 | 41.035 | 3.20 | | |
| 3 | 43.386 | 9.10 | 1.48749 | 70.2 |
| 4 | −164.730 | 6.86~31.02~38.52 | | |
| 5 | −100.429 | 1.60 | 1.69680 | 55.5 |
| 6 | 20.292 | 3.80 | 1.80518 | 25.4 |
| 7 | 61.557 | 2.43 | | |
| 8 | 52.519 | 1.50 | 1.69680 | 55.5 |
| 9 | 138.940 | 20.35~9.73~3.00 | | |
| 10 | 107.249 | 5.00 | 1.51633 | 64.1 |
| 11 | −47.796 | 0.10 | | |
| 12 | 44.696 | 5.36 | 1.51633 | 64.1 |
| 13 | −38.656 | 1.70 | 1.80518 | 25.4 |
| 14 | −477.928 | 30.61 | | |
| 15 | 104.001 | 3.73 | 1.63930 | 44.9 |
| 16 | −103.204 | 22.56 | | |
| 17 | −29.306 | 1.70 | 1.62041 | 60.3 |
| 18 | −90.591 | | | |

$\overline{n_{IIIap}} = 1.51633$ (1)

$|\Delta D_{(I-II)}/f_{II}| = 1.08$ (2)

$r_2/r_3 = 0.946$ (3)

$r_3/f_I = 0.3739$ (4)

$\overline{n_{II}} = 1.733$ (5)

$\nu_{IIp} = 25.4, \nu_{IIn} = 55.5$ (6)

$f_{IIIa}/f_{III} = 1.347$ (7)

EXAMPLE 3

$F_{NO} = 1: 4.1 \sim 4.8 \sim 5.6$
$f = 72.00 \sim 135.00 \sim 195.00$
$\omega = 17.2 \sim 8.9 \sim 6.2$
$f_B = 41.61 \sim 54.04 \sim 67.54$

| Surface No. | r | d | n | ν |
|---|---|---|---|---|
| 1 | 59.960 | 2.50 | 1.80518 | 25.4 |
| 2 | 40.809 | 2.04 | | |
| 3 | 42.353 | 9.35 | 1.51633 | 64.1 |
| 4 | −191.436 | 8.41~30.45~37.38 | | |
| 5 | −74.943 | 1.50 | 1.69680 | 55.5 |
| 6 | 75.209 | 2.30 | | |
| 7 | −77.540 | 1.60 | 1.69680 | 55.5 |
| 8 | 28.203 | 3.90 | 1.80518 | 25.4 |
| 9 | 130.885 | 25.36~11.59~3.00 | | |
| 10 | 57.453 | 6.77 | 1.51633 | 64.1 |
| 11 | −25.515 | 1.70 | 1.80518 | 25.4 |
| 12 | −46.765 | 0.10 | | |
| 13 | 49.391 | 3.05 | 1.55963 | 61.2 |
| 14 | 201.509 | 33.71 | | |
| 15 | 108.777 | 3.60 | 1.58267 | 46.4 |
| 16 | −192.015 | 10.42 | | |
| 17 | −26.088 | 1.70 | 1.65830 | 53.4 |
| 18 | −65.670 | | | |

$\overline{n_{IIIap}} = 1.5380$ (1)

$|\Delta D_{(I-II)}/f_{II}| = 0.895$ (2)

$r_2/r_3 = 0.9635$ (3)

$r_3/f_I = 0.37$ (4)

$\overline{n_{II}} = 1.733$ (5)

$\nu_{IIp} = 25.4, \nu_{IIn} = 55.5$ (6)

$f_{IIIa}/f_{III} = 1.1414$ (7)

EXAMPLE 4

$F_{NO} = 1: 4.1 \sim 4.9 \sim 5.7$
$f = 72.00 \sim 135.01 \sim 195.00$
$\omega = 17.2 \sim 8.9 \sim 6.2$
$f_B = 40.46 \sim 53.29 \sim 66.58$

| Surface No. | r | d | n | ν |
|---|---|---|---|---|
| 1 | 63.215 | 2.50 | 1.80518 | 25.4 |
| 2 | 43.227 | 2.04 | | |
| 3 | 45.093 | 9.35 | 1.51633 | 64.1 |
| 4 | −196.091 | 8.34~31.66~39.26 | | |
| 5 | −74.120 | 1.50 | 1.69680 | 55.5 |
| 6 | 74.120 | 2.30 | | |
| 7 | −77.372 | 1.60 | 1.69680 | 55.5 |
| 8 | 28.668 | 3.90 | 1.80518 | 25.4 |
| 9 | 152.463 | 24.61~11.26~3.00 | | |
| 10 | 74.250 | 4.40 | 1.51633 | 64.1 |
| 11 | −74.250 | 0.10 | | |
| 12 | 43.576 | 5.51 | 1.51633 | 64.1 |
| 13 | −43.576 | 1.70 | 1.80518 | 25.4 |
| 14 | −556.747 | 27.06 | | |
| 15 | 111.600 | 4.54 | 1.66892 | 45.0 |
| 16 | −111.600 | 17.88 | | |
| 17 | −26.480 | 1.70 | 1.67790 | 55.3 |
| 18 | −75.773 | | | |

$\overline{n_{IIIap}} = 1.51633$ (1)

$|\Delta D_{(I-II)}/f_{II}| = 0.935$ (2)

$r_2/r_3 = 0.9586$ (3)

$r_3/f_I = 0.376$ (4)

$\overline{n_{II}} = 1.733$ (5)

$\nu_{IIp}=25.4, \nu_{IIn}=55.5$ (6)

$f_{IIIa}/f_{III}=1.295$ (7)

EXAMPLE 5

$F_{NO}=1: 4.1 \sim 4.9 \sim 5.7$
$f=72.00 \sim 134.99 \sim 194.98$
$\omega=17.2 \sim 8.9 \sim 6.2$
$f_B=39.71 \sim 52.39 \sim 66.38$

| Surface No. | r | d | n | ν |
|---|---|---|---|---|
| 1 | 58.574 | 2.50 | 1.80518 | 25.4 |
| 2 | 40.482 | 2.04 | | |
| 3 | 42.210 | 9.35 | 1.51633 | 64.1 |
| 4 | −200.346 | 9.58 ∼ 31.75 ∼ 38.62 | | |
| 5 | −83.397 | 1.50 | 1.69680 | 55.5 |
| 6 | 53.348 | 2.30 | | |
| 7 | −50.940 | 1.60 | 1.69680 | 55.5 |
| 8 | 29.231 | 3.90 | 1.76182 | 26.6 |
| 9 | −1107.304 | 22.97 ∼ 10.68 ∼ 3.00 | | |
| 10 | 67.999 | 4.46 | 1.55963 | 61.2 |
| 11 | −67.999 | 0.10 | | |
| 12 | 43.877 | 5.37 | 1.51633 | 64.1 |
| 13 | −43.877 | 1.70 | 1.80518 | 25.4 |
| 14 | −982.958 | 33.71 | | |
| 15 | 77.360 | 4.54 | 1.55690 | 48.6 |
| 16 | −146.348 | 12.50 | | |
| 17 | −26.991 | 1.70 | 1.58913 | 61.2 |
| 18 | −89.841 | | | |

$\overline{n_{IIIap}}=1.5380$ (1)

$|\Delta D_{(I-II)}/f_{II}|=0.951$ (2)

$r_2/r_3=0.959$ (3)

$r_3/f_I=0.373$ (4)

$\overline{n_{II}}=1.718$ (5)

$\nu_{IIp}=26.6, \nu_{IIn}=55.5$ (6)

$f_{IIIa}/f_{III}=1.205$ (7)

Figure 2C:
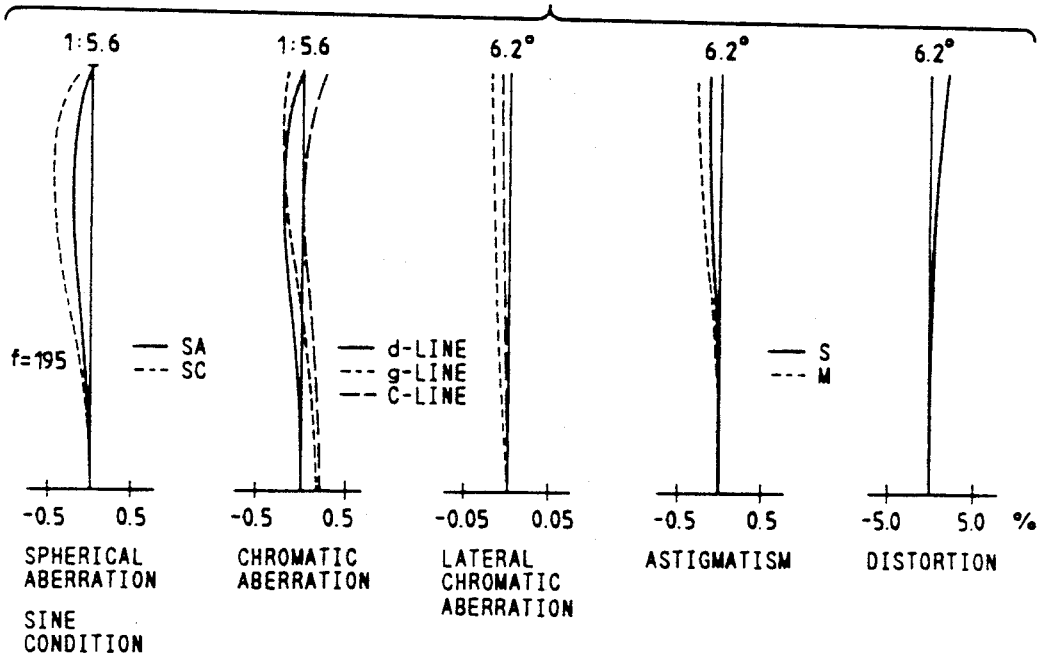
FIGS. 2C, 4C, 6C, 8C and 10C are graphs plotting the aberration curves obtained at the narrow-angle end with the zoom lens systems of Examples 1, 2, 3, 4 and 5, respectively.
Figure 3:
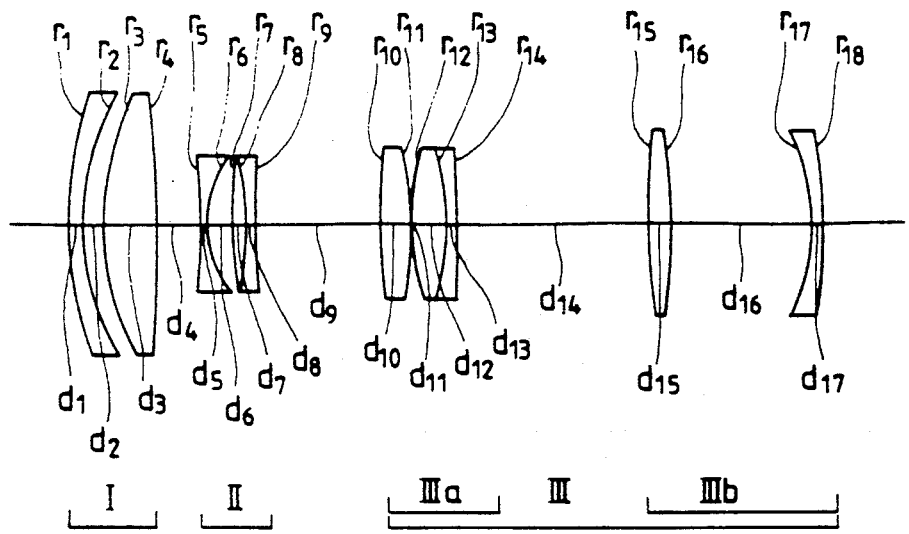
FIGS. 3, 5, 7 and 9 are simplified cross-sectional views of the zoom lens systems of Examples 2, 3, 4 and 5, respectively, when they are at the wide-angle end.
Figure 4A:
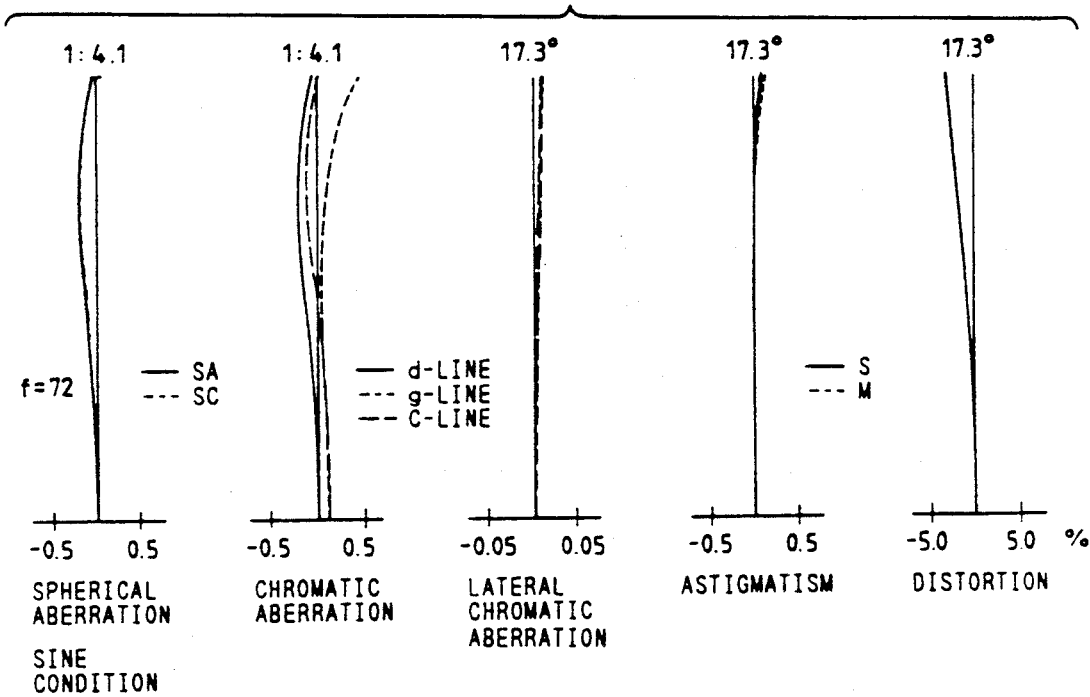
Figure 4B:
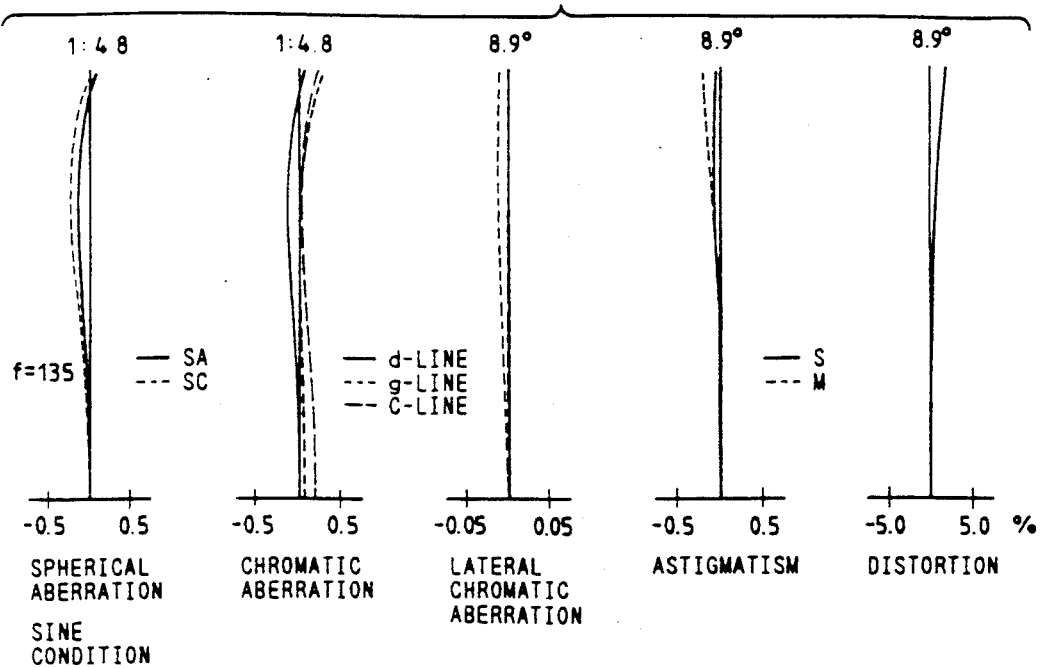
Figure 4C:
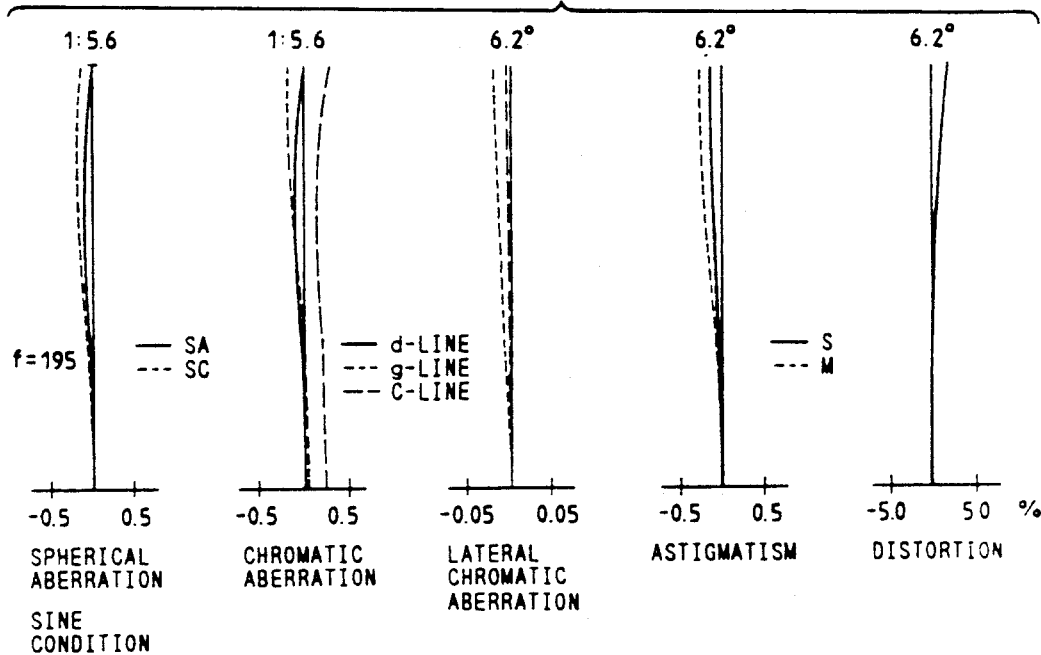
Figure 5:
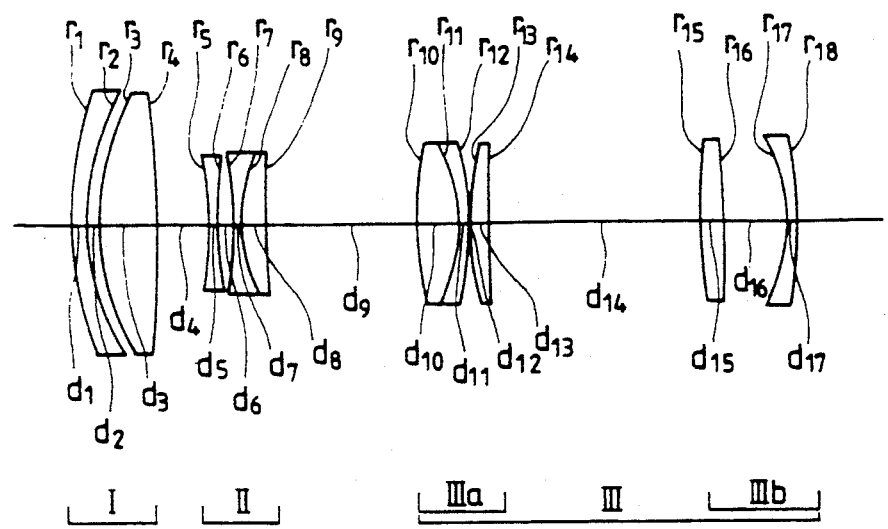
Figure 6A:
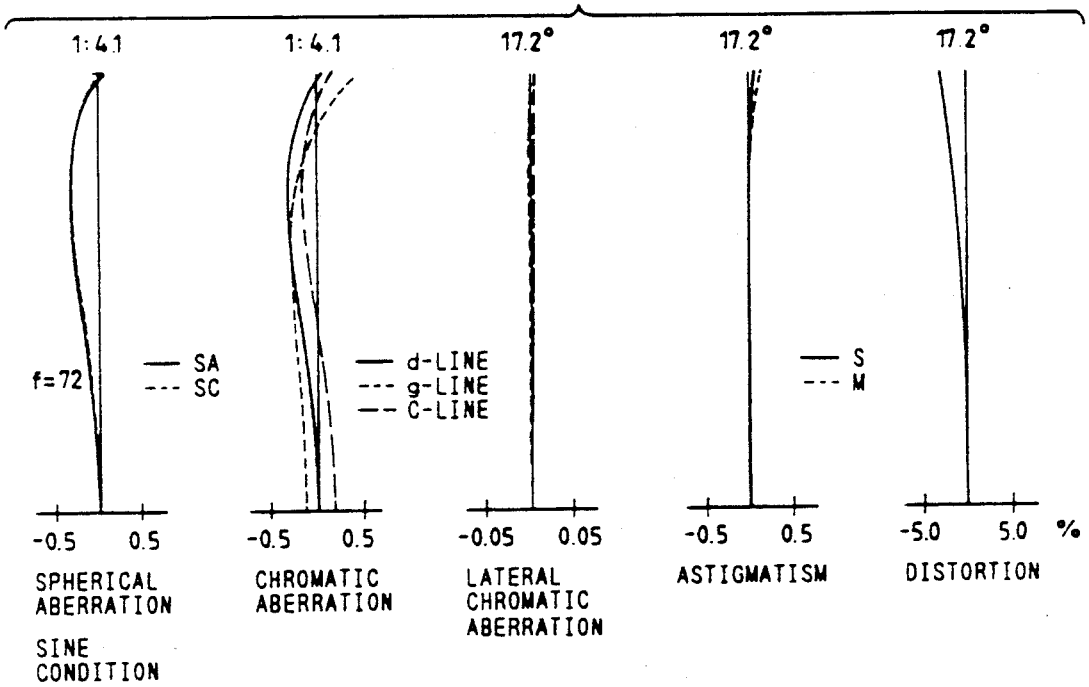
Figure 6B:
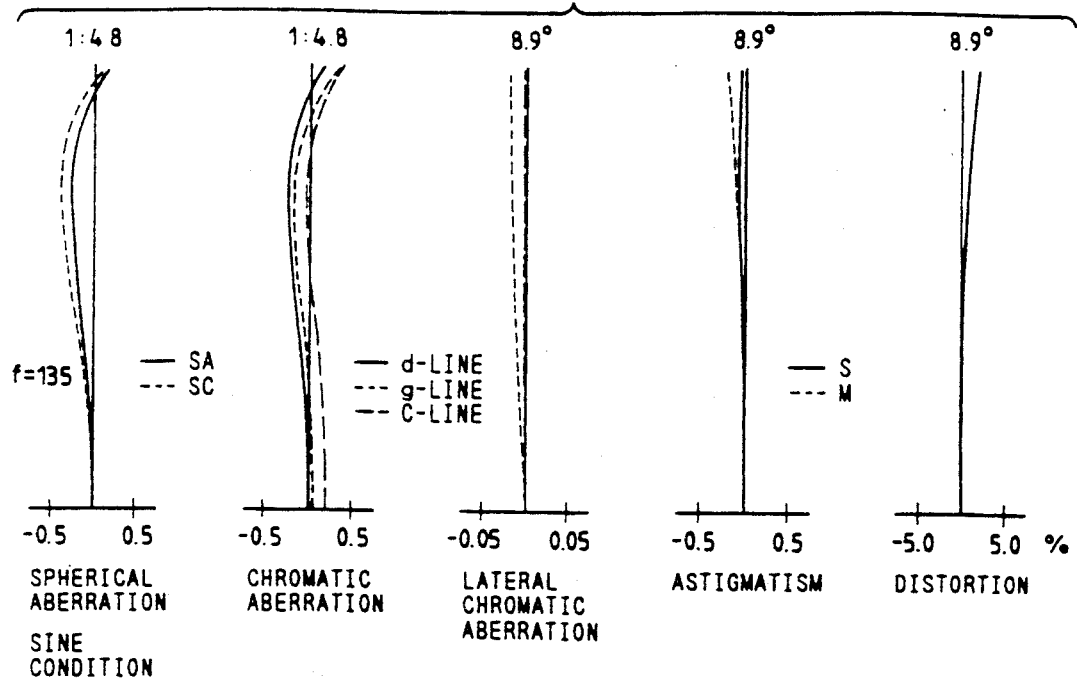
Figure 6C:
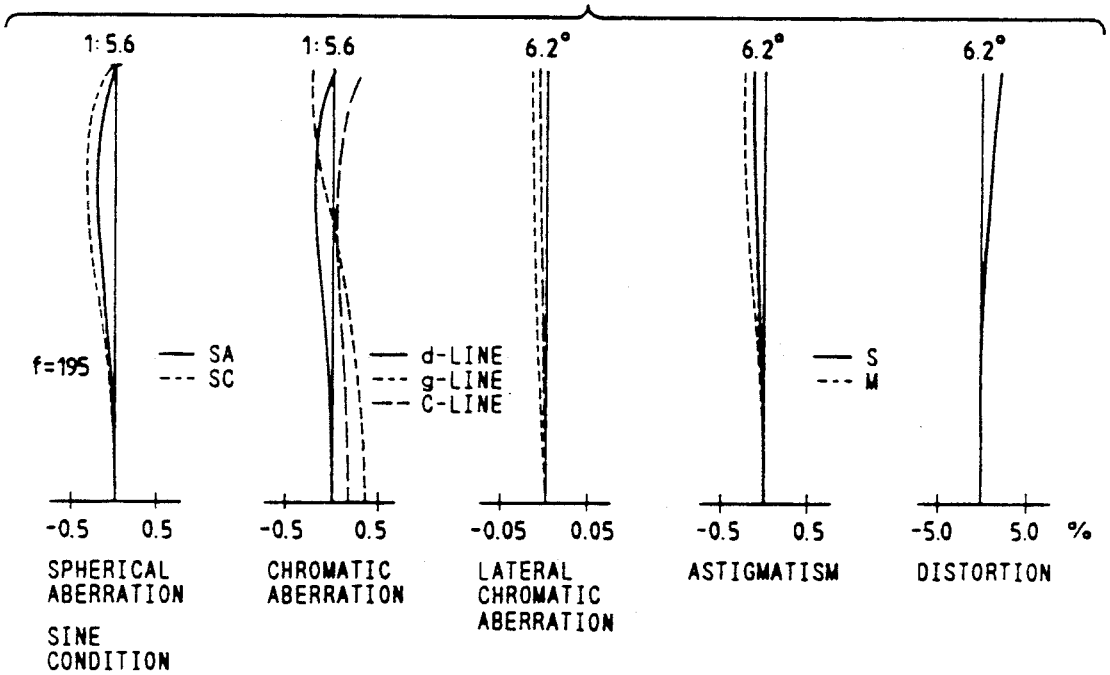
Figure 7:
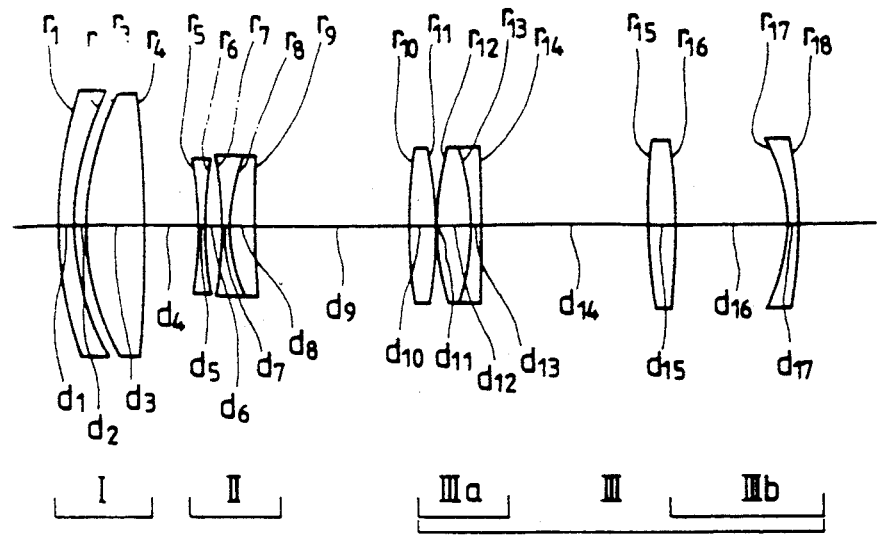
Figure 8A:
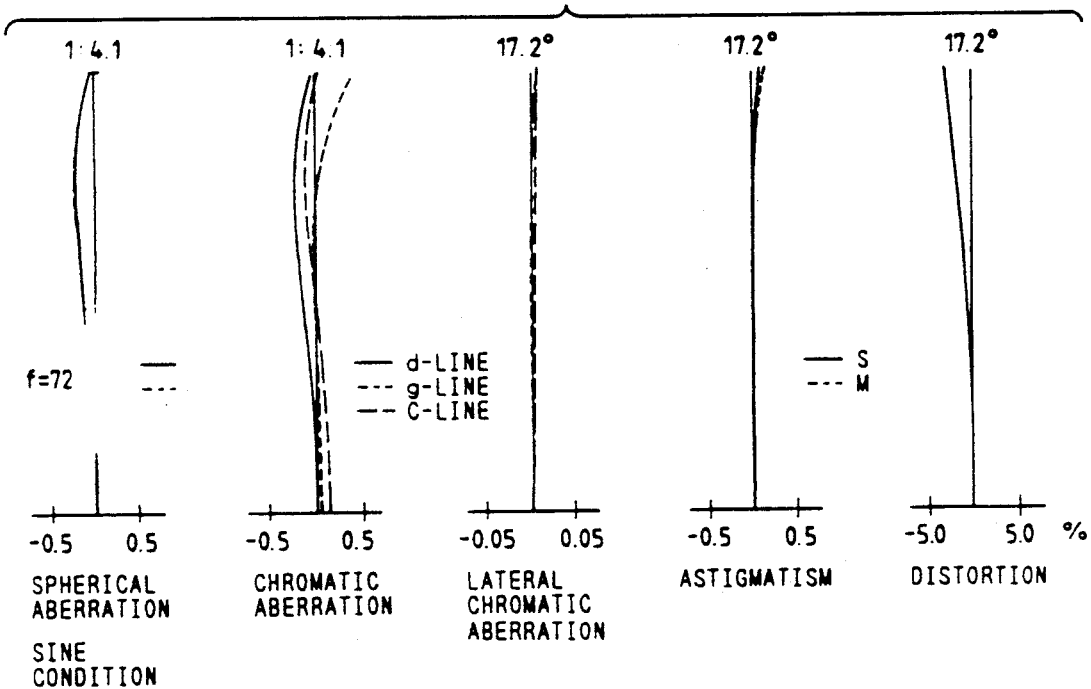
Figure 8B:
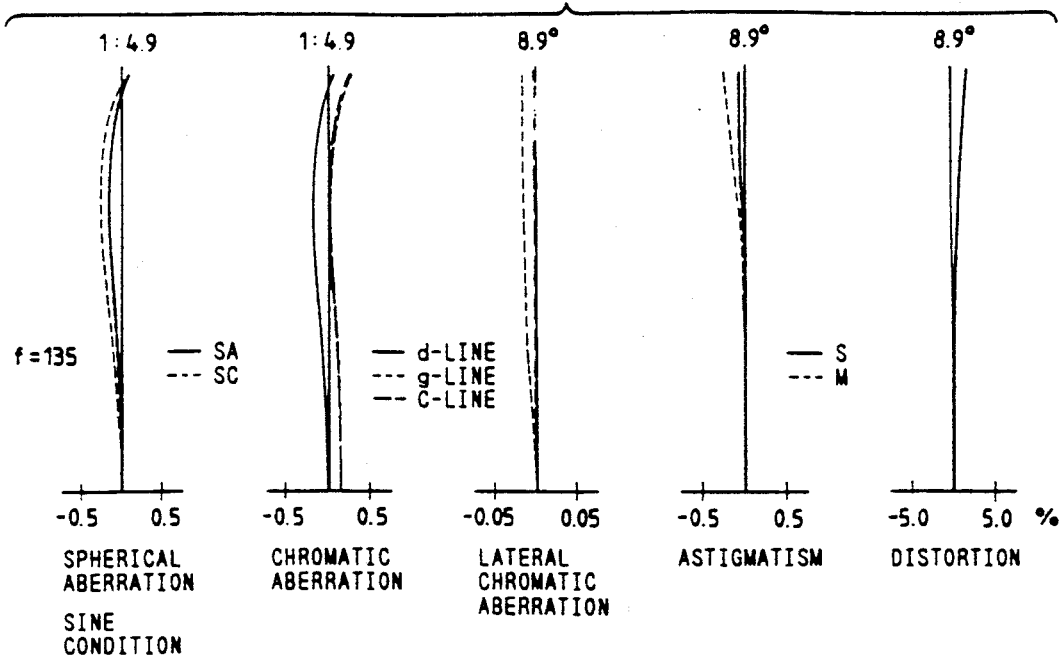
Figure 8C:
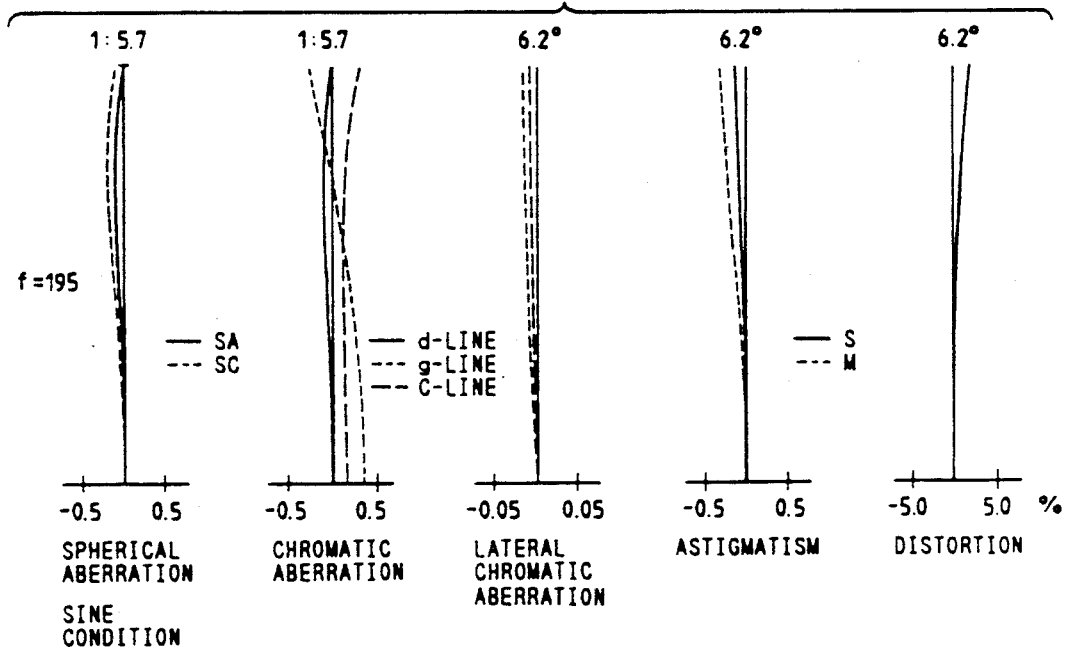
Figure 9:
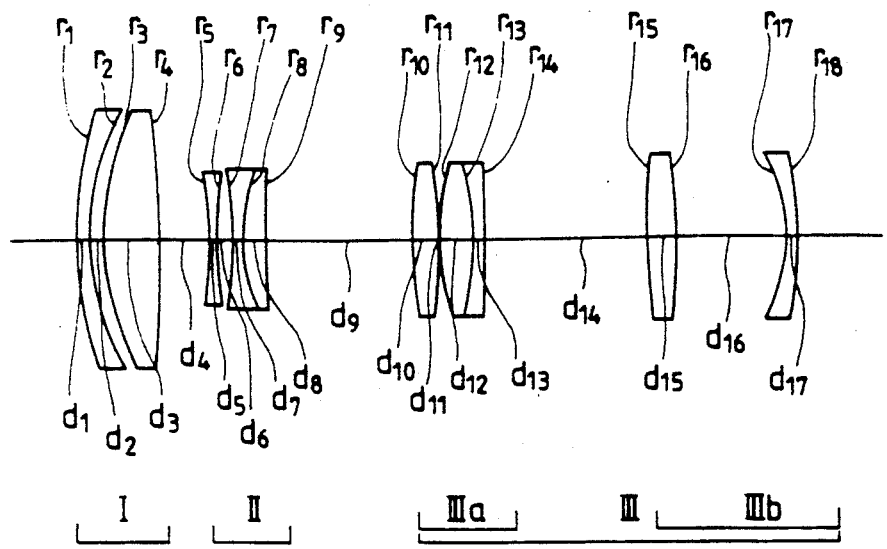
Figure 10A:
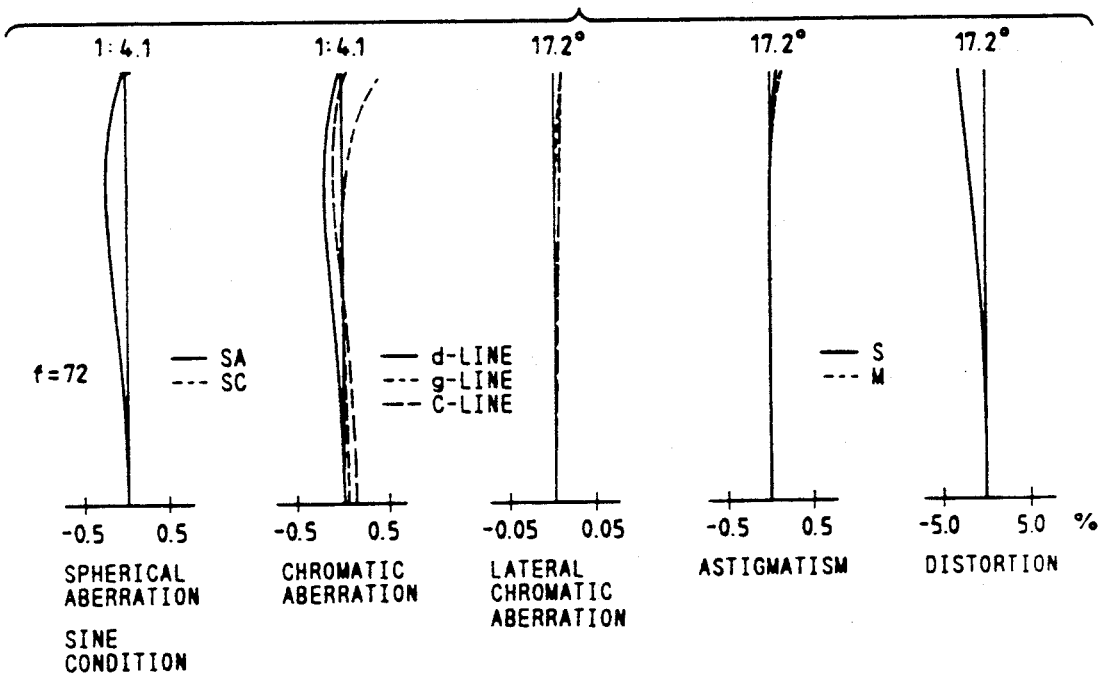
Figure 10B:
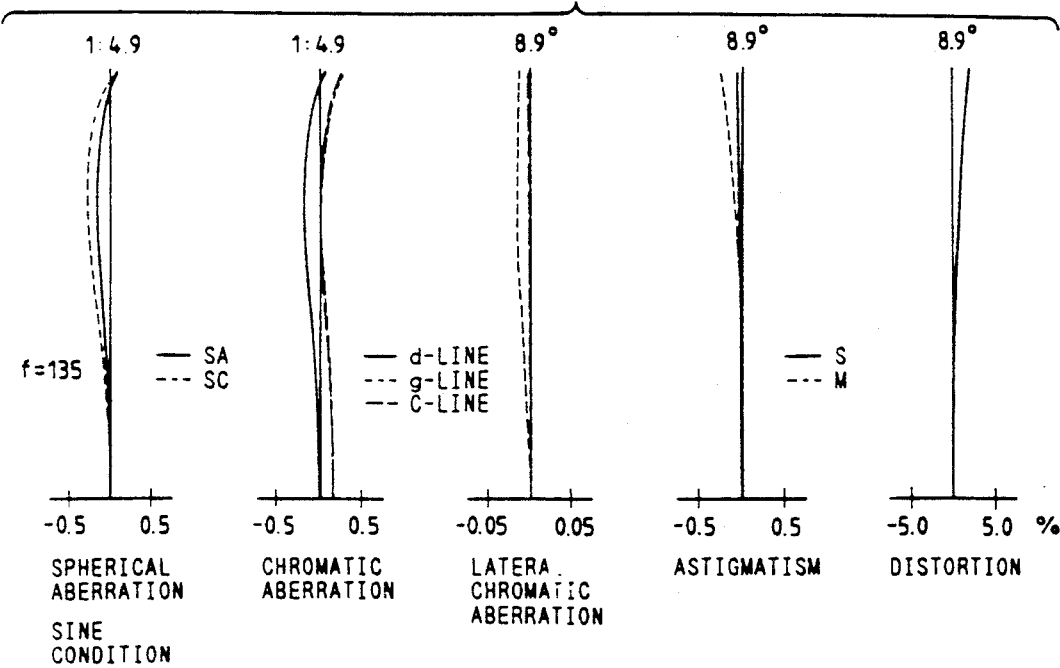
Figure 10C:
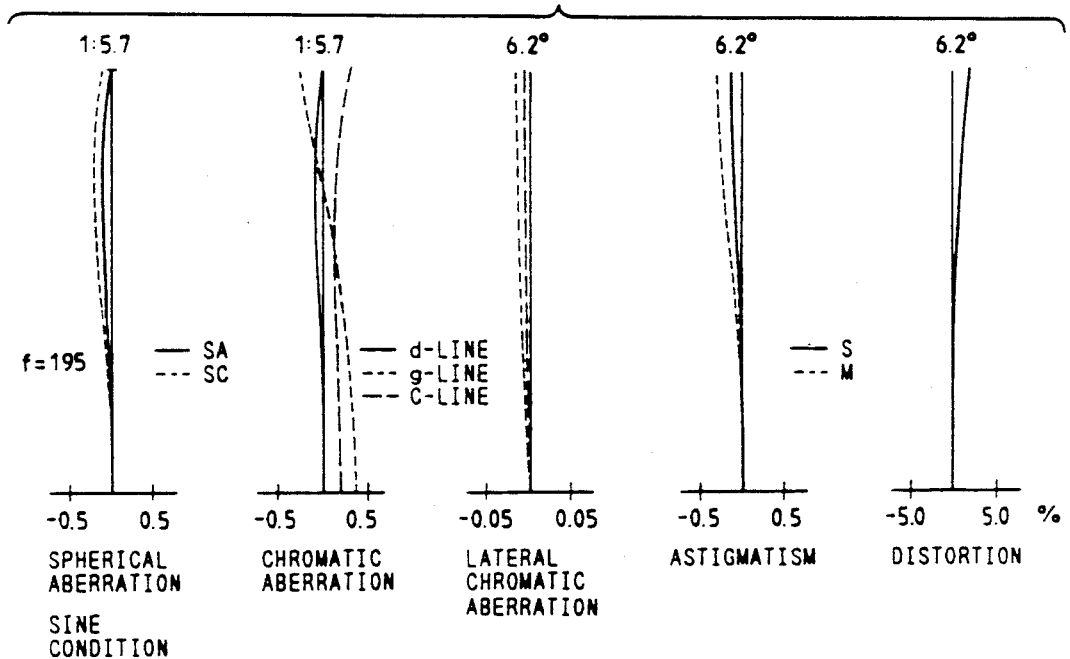

As described in the foregoing pages, the telephoto zoom lens system contemplated by the present invention is of a type that features a zoom ratio on the order of 3. By satisfying conditions (1) to (7) set forth hereinabove, this zoom lens system offers various advantages. It can be constructed of an inexpensive optical material, may be composed of a small number of components and hence features compactness and in spite of its compact size, the lens system of the present invention insures satisfactory performance as will be apparent from the aberration curves plotted in FIGS. 2, 4, 6, 8 and 10.

What is claimed is:

1. A telephoto zoom lens system comprising, in order from an object side, a first lens group I having a positive refractive power, a second lens group II having a negative refractive power, and a third lens group III having a positive refractive power, wherein zooming is performed by moving the three lens groups I, II an III independently of one another along an optical axis, and focusing is performed by moving the first lens group I along the optical axis, wherein said first lens group I comprises a two-unit, two-element configuration having a first lens which is a negative meniscus lens element having a convex surface directed toward the object, and a second lens which is a positive lens element separated from said first lens by an air gap and having a convex surface of large curvature directed toward the object; wherein the second lens group II is composed of two negative lens elements and one positive lens element; and wherein said third lens group III includes first and second lens units IIIa and IIIb in order from the object side, with said first lens unit having a positive refractive power and consisting of two positive lens elements and one negative lens element, and said second lens unit IIIb consisting of a positive lens and a negative meniscus lens having a convex surface directed toward the image.

2. A telephone lens system according to claim 1, wherein said lens system satisfies the following conditions:

$\overline{n_{IIIap}}<1.6$ (1)

$0.8<|\Delta D_{(I-II)}/f_{II}|<1.2, f_{II}<0$ (2)

$0.8<r_2/r_3<1.0$ (3)

$0.3<r_3/f_I<0.5$ (4)

$\overline{n_{II}}>1.65$ (5)

$\nu_{IIp}<35, \nu_{IIn}>50$ (6)

$1.0<f_{IIIa}/f_{III}<1.4$ (7)

where:

$\overline{n_{IIIap}}$ is the average of the refractive indices at the d-line of the positive lens included in lens unit IIIa;

$\Delta D_{(I-II)}$ is the amount of change in the aerial distance between the first and second lens groups I and II during zooming;

$f_{II}$ is the focal length of the second lens group II;

$r_2$ is the radius of curvature of the image side surface of the first lens of the first lens group I;

$r_3$ is the radius of curvature of the object side surface of the second lens of the first lens group I;

$f_I$ is the focal length of the first lens group I;

$\overline{n_{II}}$ is the average of the refractive indices at the d-line of the lenses of which the second lens group II is composed;

$\nu_{IIp}$ is the Abbe number of the positive lens included in the second lens group II;

$\nu_{IIn}$ is the Abbe number of the negative lens included in the second lens group II;

$f_{III}$ is the focal length of the third lens group III; and $f_{IIIa}$ is the focal length of the lens unit IIIa.

3. A telephoto lens system according to claim 1, wherein said lens system satisfies the following conditions:

$\overline{n_{IIIap}}<1.6$ (1)

$0.8<|\Delta D_{(I-II)}/f_{II}|<1.2, f_{II}<0$ (2)

$0.8<r_2/r_3<1.0$ (3)

$0.3<r_3/f_I<0.5$ (4)

$\overline{n_{II}}>1.65$ (5)

$\nu_{IIp}<35, \nu_{IIn}>50$ (6)

$1.0<f_{IIIa}/f_{III}<1.4$ (7)

where:

$\overline{n_{IIIap}}$ is the average of the refractive indices at the d-line of the positive lens included in lens unit IIIa;

$\Delta D_{(I-II)}$ is the amount of change in the aerial distance between the first and second lens groups I and II during zooming;

$f_{II}$ is the focal length of the second lens group II;

$r_2$ is the radius of curvature of the image side surface of the first lens of the first lens group I;

$r_3$ is the radius of curvature of the object side surface of the second lens of the first lens group I;

$f_I$ is the focal length of the first lens group I;

$\overline{n_{II}}$ is the average of the refractive indices at the d-line of the lenses of which the second lens group II is composed;

$\nu_{IIp}$ is the Abbe number of the positive lens included in the second lens group II;

$\nu_{IIn}$ is the Abbe number of each negative lens included in the second lens group II;

$f_{III}$ is the focal length of the third lens group III; and $f_{IIIa}$ is the focal length of the lens unit IIIa.

4. A telephoto lens system according to claim 1, wherein said lens system satisfies the following conditions:

$$\overline{n_{IIIap}} < 1.6 \qquad (1)$$

$$0.8 < |\Delta D_{(I-II)}/f_{II}| < 1.2, f_{II} < 0 \qquad (2)$$

$$0.8 < r_2/r_3 < 1.0 \qquad (3)$$

$$0.3 < r_3/f_I < 0.5 \qquad (4)$$

$$\overline{n_{II}} > 1.65 \qquad (5)$$

$$\nu_{IIp} < 35, \nu_{IIn} > 50 \qquad (6)$$

$$1.0 < f_{IIIa}/f_{III} < 1.4 \qquad (7)$$

where:

$\overline{n_{IIIap}}$ is the average of the refractive indices at the d-line of the positive lens included in lens unit IIIa;

$\Delta D_{(I-II)}$ is the amount of change in the aerial distance between the first and second lens groups I and II during zooming;

$f_{II}$ is the focal length of the second lens group II;

$r_2$ is the radius of curvature of the image side surface of the first lens of the first lens group I;

$r_3$ is the radius of curvature of the object side surface of the second lens of the first lens group I;

$f_I$ is the focal length of the first lens group I;

$\overline{n_{II}}$ is the average of the refractive indices at the d-line of the lenses of which the second lens group II is composed;

$\nu_{IIp}$ is the Abbe number of the positive lens included in the second lens group II;

$\nu_{IIn}$ is the Abbe number of each negative lens included in the second lens group II;

$f_{III}$ is the focal length of the third lens group III; and $f_{IIIa}$ is the focal length of the lens unit IIIa.

* * * * *